United States Patent
McMahon et al.

(10) Patent No.: US 11,995,240 B2
(45) Date of Patent: May 28, 2024

(54) METHOD AND SYSTEM FOR CONVEYING DIGITAL TEXTURE INFORMATION TO A USER

(71) Applicant: NeoSensory, Inc., Palo Alto, CA (US)

(72) Inventors: Kathleen W. McMahon, Palo Alto, CA (US); David M. Eagleman, Palo Alto, CA (US); Michael V. Perrotta, Palo Alto, CA (US)

(73) Assignee: NeoSensory, Inc., Palo Alto, CA (US)

( * ) Notice: Subject to any disclaimer, the term of this patent is extended or adjusted under 35 U.S.C. 154(b) by 0 days.

(21) Appl. No.: 17/988,060

(22) Filed: Nov. 16, 2022

(65) Prior Publication Data

US 2023/0152896 A1 May 18, 2023

Related U.S. Application Data

(60) Provisional application No. 63/333,013, filed on Apr. 20, 2022, provisional application No. 63/280,036, filed on Nov. 16, 2021.

(51) Int. Cl.
*G06F 3/01* (2006.01)
*G06F 3/0488* (2022.01)
*G06V 10/77* (2022.01)

(52) U.S. Cl.
CPC .............. *G06F 3/016* (2013.01); *G06F 3/011* (2013.01); *G06F 3/0488* (2013.01); *G06V 10/7715* (2022.01)

(58) Field of Classification Search
CPC ........ G06F 3/016; G06F 3/011; G06F 3/0488; G06F 3/04883; G06F 2203/014; G06V 10/7715
See application file for complete search history.

(56) References Cited

U.S. PATENT DOCUMENTS

| | | | |
|---|---|---|---|
| 3,342,923 A | 9/1967 | Henley | |
| 4,255,801 A | 3/1981 | Ode et al. | |
| 4,354,064 A | 10/1982 | Scott | |
| 4,581,491 A | 4/1986 | Boothroyd | |
| 4,665,494 A | 5/1987 | Tanaka et al. | |
| 4,926,879 A | 5/1990 | Sevrain et al. | |

(Continued)

FOREIGN PATENT DOCUMENTS

| | | |
|---|---|---|
| WO | 2008106698 A1 | 9/2008 |
| WO | 2012069429 A1 | 5/2012 |

OTHER PUBLICATIONS

"Neosensory Buzz", Neosensory Aug. 17, 2020 (Aug. 17, 2020).

(Continued)

*Primary Examiner* — William Lu

(74) *Attorney, Agent, or Firm* — Jeffrey Schox; Caitlin Ploch

(57) ABSTRACT

A system for conveying digital texture information to a user includes and/or interfaces with a tactile stimulation device and a processing subsystem. A method for conveying digital texture information to a user includes any or all of: receiving a set of inputs; characterizing a digital object and/or a user based on the set of inputs; determining a stimulation pattern based on the characterization(s); providing stimulation to the user according to the stimulation pattern; and repeating any or all of the above processes.

20 Claims, 8 Drawing Sheets

(1 of 8 Drawing Sheet(s) Filed in Color)

(56) References Cited

U.S. PATENT DOCUMENTS

| | | |
|---|---|---|
| 5,553,148 A | 9/1996 | Werle |
| 5,655,271 A | 8/1997 | Maxwell-Trumble et al. |
| 6,027,463 A | 2/2000 | Moriyasu |
| 6,155,995 A | 12/2000 | Lin |
| 6,272,466 B1 | 8/2001 | Harada et al. |
| 6,295,703 B1 | 10/2001 | Adams et al. |
| 6,671,618 B2 | 12/2003 | Hoisko |
| 7,146,218 B2 | 12/2006 | Esteller et al. |
| 7,222,075 B2 | 5/2007 | Petrushin |
| 7,232,948 B2 | 6/2007 | Zhang |
| 7,921,069 B2 | 4/2011 | Canny et al. |
| 7,979,146 B2 | 7/2011 | Ullrich et al. |
| 8,005,681 B2 | 8/2011 | Hovestadt et al. |
| 8,068,025 B2 | 11/2011 | Devenyi et al. |
| 8,588,464 B2 | 11/2013 | Albertson et al. |
| 8,724,841 B2 | 5/2014 | Bright et al. |
| 8,754,757 B1 | 6/2014 | Ullrich et al. |
| 8,952,888 B2 | 2/2015 | Van Den Eerenbeemd et al. |
| 9,019,087 B2 | 4/2015 | Bakircioglu et al. |
| 9,298,260 B2 | 3/2016 | Karaoguz et al. |
| 9,317,116 B2 | 4/2016 | Ullrich et al. |
| 9,324,320 B1 | 4/2016 | Stolcke et al. |
| 9,345,433 B1 | 5/2016 | Shinozuka et al. |
| 9,400,548 B2 | 7/2016 | Zhang et al. |
| 9,443,410 B1 | 9/2016 | Constien |
| 9,474,683 B1 | 10/2016 | Mortimer et al. |
| 9,613,619 B2 | 4/2017 | Lev-Tov et al. |
| 9,626,845 B2 | 4/2017 | Eagleman et al. |
| 9,659,384 B2 | 5/2017 | Shaji et al. |
| 9,714,075 B2 | 7/2017 | Watkins et al. |
| 9,735,364 B2 | 8/2017 | Cheng et al. |
| 9,905,090 B2 | 2/2018 | Ullrich et al. |
| 9,987,962 B1 | 6/2018 | Salter et al. |
| 10,147,460 B2* | 12/2018 | Ullrich ............... G06T 7/40 |
| 10,152,133 B2* | 12/2018 | Lim .................... G06T 7/11 |
| 10,296,088 B2* | 5/2019 | Mazzola ............ G06T 13/20 |
| 10,642,362 B2 | 5/2020 | Eagleman et al. |
| 11,054,907 B2* | 7/2021 | Lacroix .............. G06F 3/041 |
| 11,132,058 B1 | 9/2021 | Gupta et al. |
| 11,194,386 B1 | 12/2021 | Zhao |
| 11,199,903 B1* | 12/2021 | Jung .................. A61B 5/4851 |
| 11,216,069 B2 | 1/2022 | Berenzweig et al. |
| 11,249,550 B2 | 2/2022 | Won et al. |
| 11,467,668 B2* | 10/2022 | Eagleman ............ G06F 3/011 |
| 11,507,203 B1 | 11/2022 | Bosworth |
| 11,809,629 B1 | 11/2023 | Segil |
| 2002/0111737 A1 | 8/2002 | Hoisko |
| 2002/0163498 A1 | 11/2002 | Chang et al. |
| 2002/0194002 A1 | 12/2002 | Petrushin |
| 2003/0025595 A1 | 2/2003 | Langberg |
| 2003/0067440 A1 | 4/2003 | Rank |
| 2003/0117371 A1 | 6/2003 | Roberts et al. |
| 2003/0151597 A1 | 8/2003 | Roberts et al. |
| 2003/0158587 A1 | 8/2003 | Esteller et al. |
| 2005/0093874 A1* | 5/2005 | Levene ............... G06T 15/04 345/582 |
| 2005/0113167 A1 | 5/2005 | Buchner et al. |
| 2007/0041600 A1 | 2/2007 | Zachman |
| 2007/0242040 A1 | 10/2007 | Ullrich et al. |
| 2008/0120029 A1 | 5/2008 | Zelek et al. |
| 2008/0140422 A1 | 6/2008 | Hovestadt et al. |
| 2008/0170118 A1 | 7/2008 | Albertson et al. |
| 2009/0006363 A1 | 1/2009 | Canny et al. |
| 2009/0012638 A1 | 1/2009 | Lou |
| 2009/0096632 A1 | 4/2009 | Ullrich et al. |
| 2009/0167701 A1* | 7/2009 | Ronkainen .......... G06F 3/016 345/173 |
| 2009/0250267 A1* | 10/2009 | Heubel ................ G06F 3/041 178/18.03 |
| 2010/0231367 A1* | 9/2010 | Cruz-Hernandez .......... G06F 3/0488 345/173 |
| 2010/0231539 A1* | 9/2010 | Cruz-Hernandez ..... G06F 3/017 345/173 |
| 2010/0231550 A1* | 9/2010 | Cruz-Hernandez ..... G06F 3/016 345/174 |
| 2010/0249637 A1 | 9/2010 | Walter et al. |
| 2010/0302033 A1 | 12/2010 | Devenyi et al. |
| 2011/0061017 A1 | 3/2011 | Ullrich et al. |
| 2011/0063208 A1 | 3/2011 | Van et al. |
| 2011/0173574 A1 | 7/2011 | Clavin et al. |
| 2011/0202155 A1 | 8/2011 | Ullrich et al. |
| 2011/0202337 A1 | 8/2011 | Fuchs et al. |
| 2011/0221694 A1 | 9/2011 | Karaoguz et al. |
| 2011/0319796 A1 | 12/2011 | Campdera |
| 2012/0023785 A1 | 2/2012 | Barnes et al. |
| 2012/0065714 A1 | 3/2012 | Szasz et al. |
| 2012/0223880 A1* | 9/2012 | Birnbaum ............ G06F 3/0346 345/156 |
| 2012/0229401 A1* | 9/2012 | Birnbaum ............ G06F 3/016 345/173 |
| 2013/0102937 A1 | 4/2013 | Ehrenreich et al. |
| 2013/0116852 A1 | 5/2013 | Dijk et al. |
| 2013/0147836 A1 | 6/2013 | Small et al. |
| 2013/0218456 A1 | 8/2013 | Zelek et al. |
| 2013/0265286 A1 | 10/2013 | Da Costa et al. |
| 2013/0311881 A1* | 11/2013 | Birnbaum ............ G06F 3/0485 715/702 |
| 2014/0049491 A1* | 2/2014 | Nagar ................. G06F 3/016 345/173 |
| 2014/0055352 A1 | 2/2014 | Davis et al. |
| 2014/0064516 A1* | 3/2014 | Cruz-Hernandez ...... G08B 6/00 381/98 |
| 2014/0104165 A1* | 4/2014 | Birnbaum ............ G06F 3/016 345/156 |
| 2014/0118127 A1* | 5/2014 | Levesque ............. G08B 6/00 340/407.2 |
| 2014/0176452 A1* | 6/2014 | Aleksov ............ G06F 3/04812 345/173 |
| 2014/0363138 A1 | 12/2014 | Coviello et al. |
| 2015/0025895 A1 | 1/2015 | Schildbach |
| 2015/0038887 A1 | 2/2015 | Piccirillo |
| 2015/0070150 A1 | 3/2015 | Levesque et al. |
| 2015/0120289 A1 | 4/2015 | Lev-Tov et al. |
| 2015/0161994 A1 | 6/2015 | Tang et al. |
| 2015/0161995 A1 | 6/2015 | Sainath et al. |
| 2015/0227204 A1 | 8/2015 | Gipson et al. |
| 2015/0230524 A1 | 8/2015 | Stevens et al. |
| 2015/0272815 A1 | 10/2015 | Kitchens |
| 2015/0294597 A1 | 10/2015 | Rizzo |
| 2015/0305974 A1 | 10/2015 | Ehrenreich et al. |
| 2015/0351999 A1 | 12/2015 | Brouse |
| 2015/0356889 A1 | 12/2015 | Schwartz |
| 2015/0362994 A1* | 12/2015 | Rihn ................... G06F 3/016 345/156 |
| 2016/0012688 A1 | 1/2016 | Eagleman et al. |
| 2016/0021511 A1 | 1/2016 | Jin et al. |
| 2016/0026253 A1 | 1/2016 | Bradski et al. |
| 2016/0027338 A1 | 1/2016 | Ebeling et al. |
| 2016/0049915 A1 | 2/2016 | Wang et al. |
| 2016/0098844 A1 | 4/2016 | Shaji et al. |
| 2016/0098987 A1 | 4/2016 | Stolcke et al. |
| 2016/0103489 A1* | 4/2016 | Cruz-Hernandez ...... G06F 1/163 345/161 |
| 2016/0103590 A1 | 4/2016 | Vu et al. |
| 2016/0179198 A1* | 6/2016 | Levesque ............. G06F 1/163 340/407.1 |
| 2016/0179199 A1 | 6/2016 | Levesque et al. |
| 2016/0187987 A1 | 6/2016 | Ullrich et al. |
| 2016/0254454 A1 | 9/2016 | Cheng et al. |
| 2016/0255944 A1 | 9/2016 | Baranski et al. |
| 2016/0274662 A1 | 9/2016 | Rimon et al. |
| 2016/0284189 A1 | 9/2016 | Constien |
| 2016/0292856 A1 | 10/2016 | Niemeijer et al. |
| 2016/0297611 A1 | 10/2016 | Williams et al. |
| 2016/0313801 A1 | 10/2016 | Wagner et al. |
| 2016/0320842 A1* | 11/2016 | Saboune ............. G06F 3/016 |
| 2016/0358429 A1 | 12/2016 | Ullrich et al. |
| 2016/0367190 A1 | 12/2016 | Vaitaitis |
| 2017/0131775 A1* | 5/2017 | Clements ............ G06F 3/016 |
| 2017/0169673 A1 | 6/2017 | Billington et al. |
| 2017/0206889 A1 | 7/2017 | Lev-Tov et al. |

(56) References Cited

U.S. PATENT DOCUMENTS

| | | |
|---|---|---|
| 2017/0213568 A1 | 7/2017 | Foshee |
| 2017/0290736 A1 | 10/2017 | Idris |
| 2017/0294086 A1 | 10/2017 | Kerdemelidis |
| 2017/0348184 A1 | 12/2017 | Pisharodi et al. |
| 2018/0039333 A1 | 2/2018 | Carter et al. |
| 2018/0095535 A1* | 4/2018 | Laaksonen .......... G06F 3/03547 |
| 2018/0239428 A1 | 8/2018 | Maheriya |
| 2018/0284894 A1 | 10/2018 | Raut et al. |
| 2018/0303702 A1 | 10/2018 | Novich et al. |
| 2018/0356893 A1 | 12/2018 | Soni |
| 2018/0374264 A1 | 12/2018 | Gatson et al. |
| 2019/0001135 A1* | 1/2019 | Yoo .................... A61N 1/36132 |
| 2019/0043322 A1* | 2/2019 | Tachi .................... G06F 3/016 |
| 2019/0045296 A1 | 2/2019 | Ralph |
| 2019/0087050 A1 | 3/2019 | Mani |
| 2019/0171291 A1 | 6/2019 | Domenikos et al. |
| 2019/0235628 A1 | 8/2019 | Lacroix et al. |
| 2019/0265783 A1 | 8/2019 | Wedig |
| 2019/0302887 A1 | 10/2019 | Sinclair et al. |
| 2019/0311589 A1* | 10/2019 | Choi .................... G06F 3/016 |
| 2019/0337451 A1 | 11/2019 | Bacchus et al. |
| 2019/0340803 A1 | 11/2019 | Comer |
| 2019/0384397 A1 | 12/2019 | Cruz-Hernandez et al. |
| 2020/0051446 A1 | 2/2020 | Rubinstein et al. |
| 2020/0073482 A1* | 3/2020 | Levesque .............. G06F 3/017 |
| 2020/0093679 A1 | 3/2020 | Sonar et al. |
| 2020/0122403 A1 | 4/2020 | Dhokia et al. |
| 2020/0211220 A1 | 7/2020 | Ilic et al. |
| 2020/0265569 A1* | 8/2020 | Lee .......................... G06F 18/24 |
| 2020/0305765 A1 | 10/2020 | Herr et al. |
| 2020/0394826 A1 | 12/2020 | Ma et al. |
| 2021/0208684 A1* | 7/2021 | Eagleman ................ G08B 6/00 |

OTHER PUBLICATIONS

"The Wristband That Gives You Superpowers", NEO.LIFE, Jan. 10, 2019 (Jan. 10, 2019) 1-16.

Horvath, Samantha, et al., "FingerSight: Fingertip Haptic Sensing of the Visual Environment", Mar. 6, 2014, IEEE, vol. 2, 2014 (Year: 2014).

Jones, Lynette A., et al., "Development of a Tactile Vest", 2004, IEEE, 0-7695-2112-6/04 (Year: 2004).

Nakamura, Mealani, et al., "An Actuator for the Tactile Vest—a Torso-Based Haptic Device", 2003, IEEE, 0-7695-1890-7/03 (Year: 2003).

Paneels, Sabrina, et al., "What's Around Me? Multi-Actuator Haptic Feedback on the Wrist", Apr. 14-18, 2013, IEEE, 978-1-4799-0088-6/13, pp. 407-412 (Year: 2013).

Plant, Geoff, "Training in the use of the Tactaid VII: A case study", KTH Computer Science and Communication (STL-QPSR), 1994, vol. 35, No. 1, pp. 091-102., Jul. 24, 2017 00:00:00.0.

Tapson, Jonathan, et al., "The Feeling of Color: A Haptic Feedback Device for the Visually Disabled", 2008, IEEE, 978-1-4244-2879-3/08, pp. 381-384 (Year: 2008).

* cited by examiner

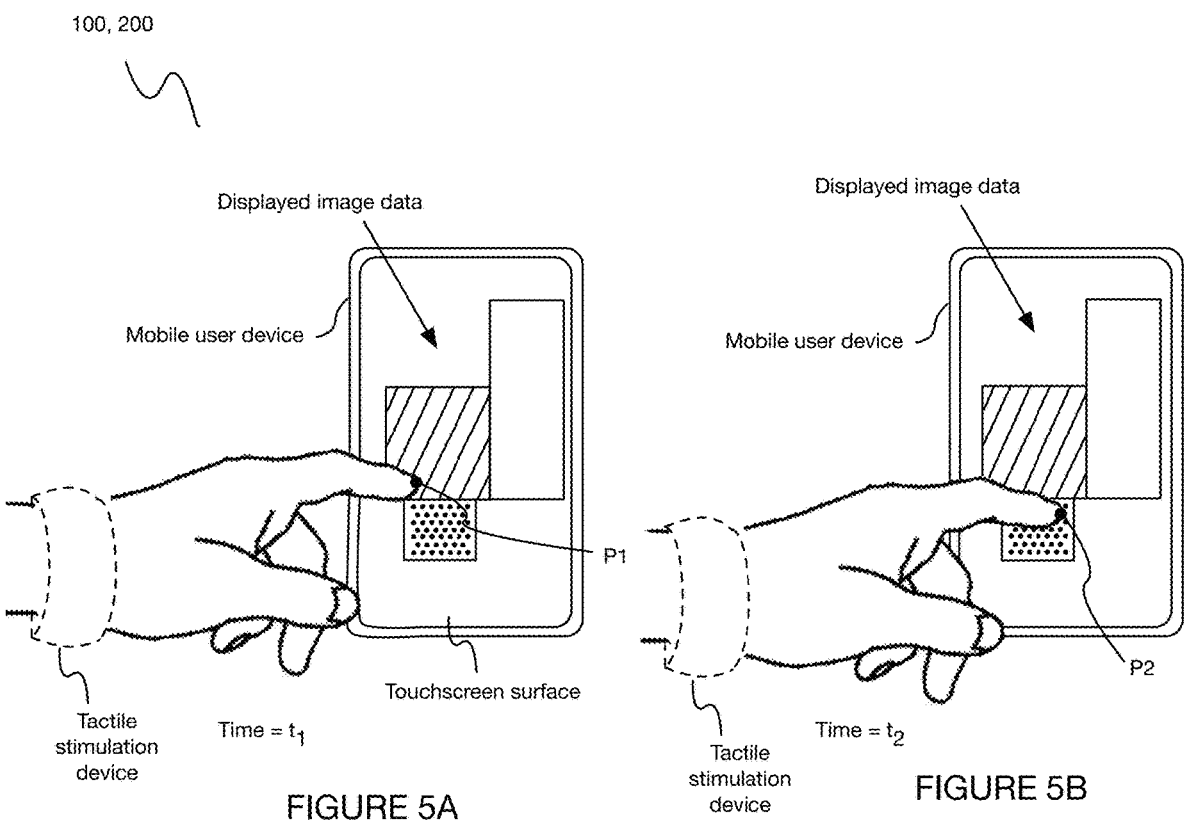

METHOD AND SYSTEM FOR CONVEYING DIGITAL TEXTURE INFORMATION TO A USER

CROSS-REFERENCE TO RELATED APPLICATIONS

This application claims the benefit of U.S. Provisional Application No. 63/280,036, filed 16 Nov. 2021, and U.S. Provisional Application No. 63/333,013, filed 20 Apr. 2022, each of which is incorporated in its entirety by this reference.

TECHNICAL FIELD

This invention relates generally to the tactile sensory field, and more specifically to a new and useful system and method for conveying digital texture information to a user in the tactile sensory field.

BACKGROUND

Haptic stimulation (equivalently referred to herein as tactile stimulation) has been shown to have several advantages in various sensory use cases, such as: supplementing other forms of sensory inputs (e.g., audio, visual, etc.) in enhancing a user experience; replacing sensory inputs which might be compromised and/or otherwise unable to be perceived (e.g., audio for hearing-impaired individuals, visual media for visually-impaired individuals, etc.); and/or otherwise enhancing user perception and the conveying of information.

The integration of haptic stimulation into virtual and digital technologies, such as virtual and/or augmented reality platforms, and websites, among others, has yet to be achieved in high resolution, non-inhibitive ways. For instance, one major area of perception which is currently lacking in conventional systems and methods is the ability to convey remote textures in a perceptible and efficient tactile way to the user, which could have numerous benefits in online retail, gaming, AR/VR experiences, and general information sharing, among others.

Thus, there is a need in the tactile sensory field to create an improved and useful system and method for conveying digital texture information to a user.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 5A-5C depict a variation of a system and method for conveying digital texture information associated digital image data to a user.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
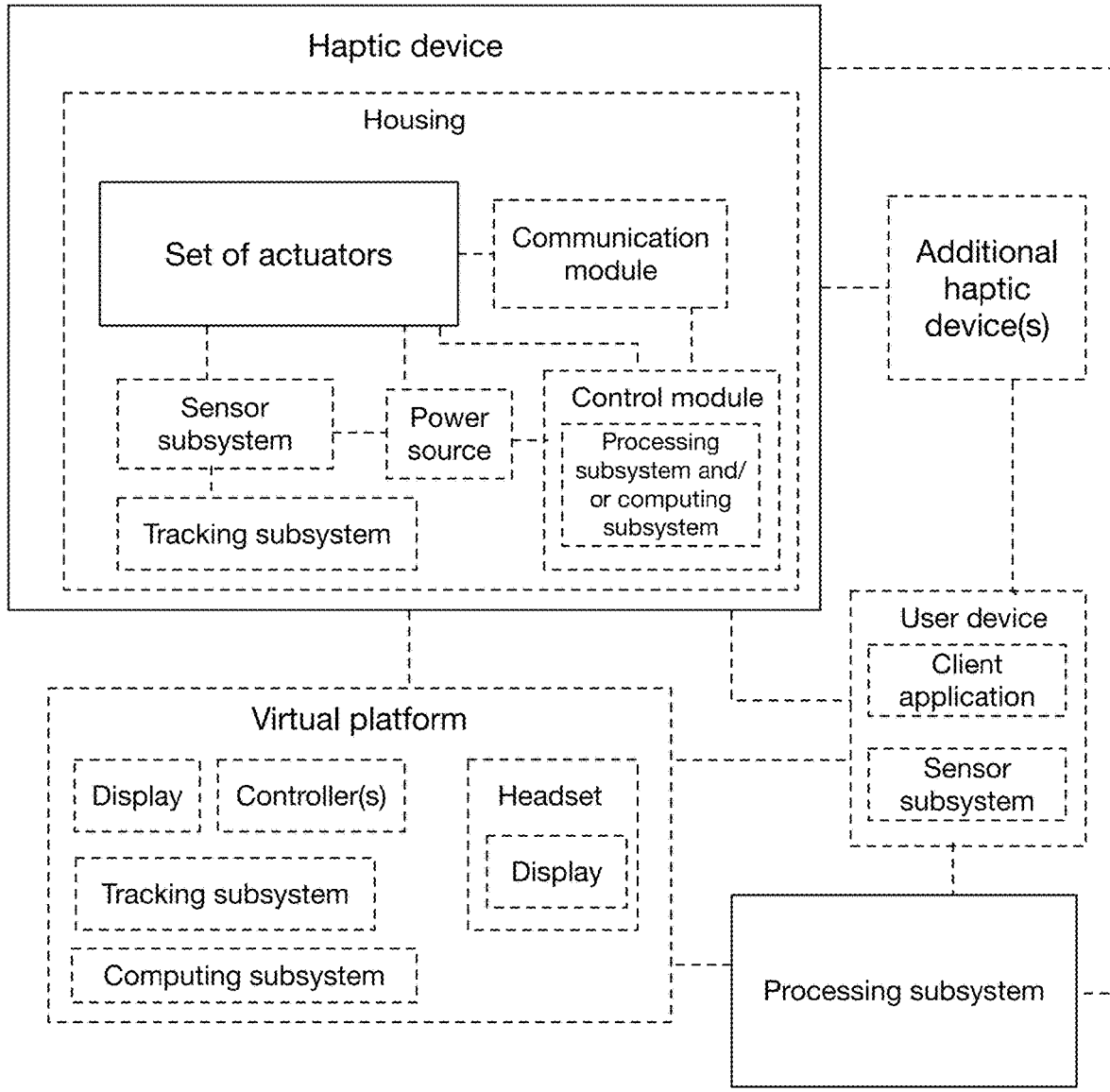
FIG. 1 is a schematic of a system for conveying digital texture information to a user.

As shown in FIG. 1, a system 100 for conveying digital texture information to a user includes and/or interfaces with a tactile stimulation device and a processing subsystem. Additionally or alternatively, the system 100 can include and/or interface with any or all of: a user device and/or $3^{rd}$ party device, a set of models and/or algorithms, a set of databases, and/or any other components. Additionally or alternatively, the system can include or all of the components as described in U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, U.S. application Ser. No. 17/033,433, filed 25 Sep. 2020, U.S. application Ser. No. 17/076,631, filed 21 Oct. 2020, U.S. application Ser. No. 17/508,670, filed 22 Oct. 2021, and U.S. application Ser. No. 17/886,785, filed 12 Aug. 2022, each of which is incorporated herein in its entirety by this reference.

Figure 2:
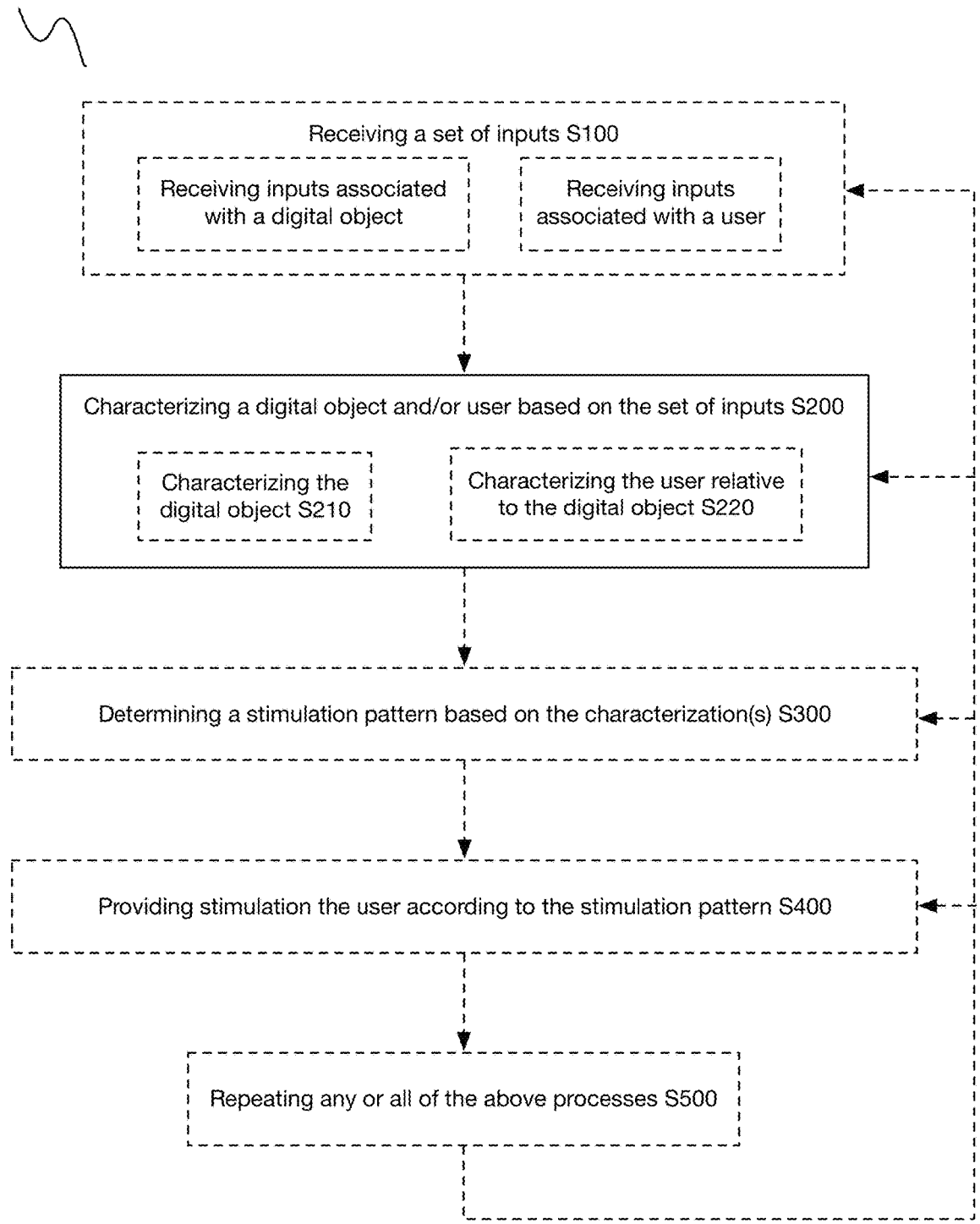
FIG. 2 is a schematic of a method for conveying digital texture information to a user.

As shown in FIG. 2, a method 200 for conveying digital texture information to a user includes any or all of: receiving a set of inputs S100; characterizing a digital object and/or a user based on the set of inputs S200; determining a stimulation pattern based on the characterization(s) S300; providing stimulation to the user according to the stimulation pattern S400; and repeating any or all of the above processes S500. Additionally or alternatively, the method 200 can include and/or interface with any or all of the processes described in: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, U.S. application Ser. No. 17/033,433, filed 25 Sep. 2020, U.S. application Ser. No. 17/076,631, filed 21 Oct. 2020, U.S. application Ser. No. 17/508,670, filed 22 Oct. 2021, and U.S. application Ser. No. 17/886,785, filed 12 Aug. 2022, each of which is incorporated herein in its entirety by this reference, or any other suitable processes performed in any suitable order. The method 200 can be performed with a system as described above and/or any other suitable system.

2. Benefits

The system and method for conveying digital texture information to a user can confer several benefits over current systems and methods.

In a first variation, the technology confers the benefit of non-intrusively conveying textural information associated with digital objects on a website or other platform (e.g., digital photo viewer, video viewer, etc.) to a user, such that a user can participate (e.g., without mobility restrictions and/or hindrances, without having limited mobility and/or a limited range of motion, while having full mobility, etc.) in immersive and informative interactions with digital objects.

In a set of examples, for instance, the technology is implemented in accordance with a set of consumer websites, such that digital representations of products can be used to convey accurate tactile information associated with the products, thereby improving the experience of the user. This can, in turn, function to improve consumer satisfaction with products purchased online, improve consumer success in the remote sale of products, and/or confer any other benefits.

In a second variation, additional or alternative to the first, the technology confers the benefit of increasing an immersive nature of an extended reality (e.g., virtual reality, extended reality, etc.) platform through the conveyance of textural information associated with virtual objects.

In a set of examples, for instance, the technology confers the benefit of enabling virtual objects in a gaming or other immersive environments to convey textural information to the user in an unobtrusive and intuitive way which enhances the immersive and/or informative nature of the environment.

In another set of examples, the technology enables videos viewed by the user to convey textural information. In a particular specific example, the textures associated with objects in the videos are deduced through a computer vision process applied to the video data with a set of one or more trained (e.g., machine learning, deep learning, etc.) models and/or algorithms.

In a third variation, additional or alternative to those described above, the technology confers the benefit of dynamically adjusting a user's tactile interactions with a virtual and/or digital object, such that the user can appropriately perceive textural information as he or she virtually interacts with the object (e.g., moves his hand along, etc.).

In a fourth variation, additional or alternative to those described above, the technology confers the benefit of non-intrusively (e.g., unobtrusively, without limiting user mobility such as the mobility constraints that result from requiring the user to wear gloves and/or wired garments, etc.) conveying textural information to a remote location of the user's body relative to the location of the user's body that is interacting with a digital and/or representation of the object. In a set of specific examples, a wristband-arranged tactile device is configured to convey tactile stimulation to a wrist of the user as he or she uses her fingertip to virtually interact with a digital object on a touchscreen, thereby providing the user with uninhibited motion of his or her fingertips and/or hands.

Additionally or alternatively, the system and method can confer any other benefit.

3. System 100

As shown in FIG. 1, a system 100 for conveying digital texture information to a user includes and/or interfaces with a tactile stimulation device and a processing subsystem. Additionally or alternatively, the system 100 can include and/or interface with any or all of: a user device and/or 3$^{rd}$ party device, a set of models and/or algorithms, a set of databases, and/or any other components. Additionally or alternatively, the system can include or all of the components as described in U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, U.S. application Ser. No. 17/033,433, filed 25 Sep. 2020, U.S. application Ser. No. 17/076,631, filed 21 Oct. 2020, U.S. application Ser. No. 17/508,670, filed 22 Oct. 2021, and U.S. application Ser. No. 17/886,785, filed 12 Aug. 2022, each of which is incorporated herein in its entirety by this reference.

The system 100 functions to improve a user's interaction with and/or the amount of information able to conveyed in association with digital and/or virtual objects, such as, but not limited: digital images, digital videos, virtual reality objects, digital and/or virtual representations of objects (e.g., in a video), objects in print (e.g., in a printed photo, magazine, drawing, etc.), and/or any other objects.

Additionally or alternatively, the system 100 can perform any other functions.

The system 100 preferably includes and/or interfaces with a haptic stimulation device (equivalently referred to herein as a haptic device and/or a tactile device and/or a tactile stimulation device), which functions to provide haptic (equivalently referred to herein as tactile) stimulation to the user.

In a preferred set of variations, for instance, the haptic stimulation device functions to provide tactile information to a user such that the user can still engage his or her mobility, other senses (e.g., visual, auditory, etc.), and/or otherwise be uninhibited and/or mostly uninhibited. In examples, for instance, the user can use his or her hands (e.g., fingers, fingertip pads, etc.) in an uninhibited fashion (e.g., in engaging with a touchscreen, in holding a set of virtual reality controllers, in virtually contacting a virtual object, etc.) while receiving tactile stimulation at a remote body region (e.g., wrist, arm, torso, etc.). The user can be trained to perceive this remote tactile stimulation as occurring at another region and/or corresponding to what real interactions with objects would feel like when occurring at that other region. In a set of examples, for instance, a user can virtually interact with digital objects and/or virtual objects using his or her hands and perceive those interactions through tactile stimulation provided at a user's wrist or other body region. Additionally or alternatively, tactile stimulation can be provided at the region (e.g., fingertip) virtually interacting with objects, at multiple regions, and/or at any other regions.

The haptic stimulation device preferably includes a set of one or more actuators, wherein the actuators individually and/or collectively function to provide tactile stimulation to a user, such as in accordance with one or more stimulation patterns (e.g., as described below). The set of one or more actuators can include any or all of: an actuator (e.g., linear resonant actuator [LRA], electroactive polymer [EAP] actuator, electromechanical polymer [EMP] actuator, etc.), a motor (e.g., brushless motor, brushed motor, direct current (DC) motor, alternating current (AC) motor, eccentric rotating mass (ERM), etc.), a piezoelectric device, and/or any other suitable vibratory elements.

The actuators can be any or all of: integrated within and/or secured to (e.g., reversibly coupled with, permanently coupled with, etc.) any or all of: a fastener, garment (e.g., vest, sleeve, etc.), band (e.g., wristband, armband, watch band, etc.), and/or any other component configured to enable the actuators to be arranged proximal to (e.g., touching, nearby, with an offset from, within a predetermined distance of, etc.) a body region of the user. Additionally or alternatively, the actuators can be independently and/or directly placed against a user (e.g., adhered to a skin surface of the user), held by a user, and/or placed at any other suitable locations relative to a user.

The actuators can be arranged in any suitable arrangements and/or configurations, such as, but not limited to: a 1-dimensional array (e.g., single row), a 2-dimensional array (e.g., multiple rows, circular arrangement, etc.), a 3-dimensional array, and/or any other configurations.

The haptic stimulation device can include any number of actuators, such as multiple actuators (e.g., 2, 3, 4, 5, 6, 7, 8, 9, 10, between 2-10, greater than 10, between 5-20, between 2 and 100, greater than 100, etc.), a single actuator, and/or any number of actuators.

In a preferred set of variations, the haptic stimulation device is configured to encircle and/or partially encircle a limb, appendage, or other body region (e.g., torso, waist, etc.) of the user, such as with, but not limited to, any or all of the following form factors: a wristband, arm band, leg band, belt, vest, anklet, sleeve, pant leg, and/or any other form factors.

In a set of examples, the haptic stimulation device is in the form of a wristband haptic stimulation device including an actuator subsystem, wherein the actuator subsystem has a set of one or more actuators arranged at one or more locations of a wrist region of the user (e.g., with a strap, wristband, bracelet, watchband, fabric, etc.), such as around a circumference of the wrist, around a partial circumference of the wrist, at a set of one or more discrete points proximal to the wrist, at any region of the arm and/or hand, and/or at any other suitable regions proximal to the user's wrist(s). Additionally or alternatively, the haptic device can be worn on any other body regions of the user (e.g., torso in a vest embodiment, leg, etc.).

In particular example, for instance, the haptic stimulation device includes a wristband device including one or more linear resonant actuators (LRAs) (e.g., 4, 8, between 1 and 10, 1, greater than 10, etc.) arranged (e.g., in a single row, in multiple rows, etc.) around a partial or full circumference of the user's wrist.

Figure 6:
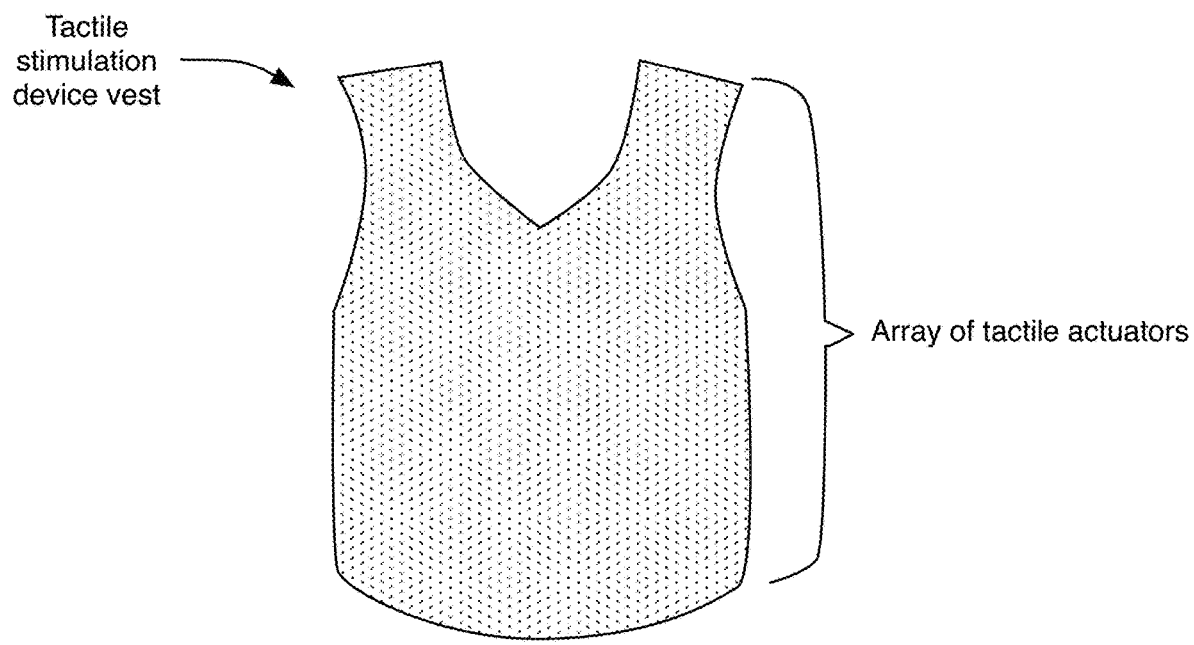
FIG. 6 depicts a variation of a tactile stimulation device.

In another set of examples (e.g., as shown in FIG. 6), the haptic stimulation is in the form of a vest or shirt such that an array of actuators can provide stimulation to chest, back, and/or side regions of the user.

Additionally or alternatively, the haptic stimulation device can include any or all of the systems, components, embodiments, and/or examples described in U.S. application Ser. No. 17/033,433, filed 25 Sep. 2020, which is incorporated herein in its entirety by this reference. Further additionally or alternatively, the system can include a non-wearable haptic device, any other devices, and/or any combination of devices.

The system 100 can optionally include and/or interface with a user device (e.g., mobile user device), which can function to: provide content (e.g., digital content, virtual content, etc.) to a user (e.g., digital content on a consumer website, images, videos, etc.), receive inputs from a user (e.g., user contact locations at a touch screen), provide outputs to a user (e.g., vibratory outputs, audio outputs, etc.), and/or perform any other functions. Examples of the user device include a smartphone, tablet, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component(s).

Figure 3:
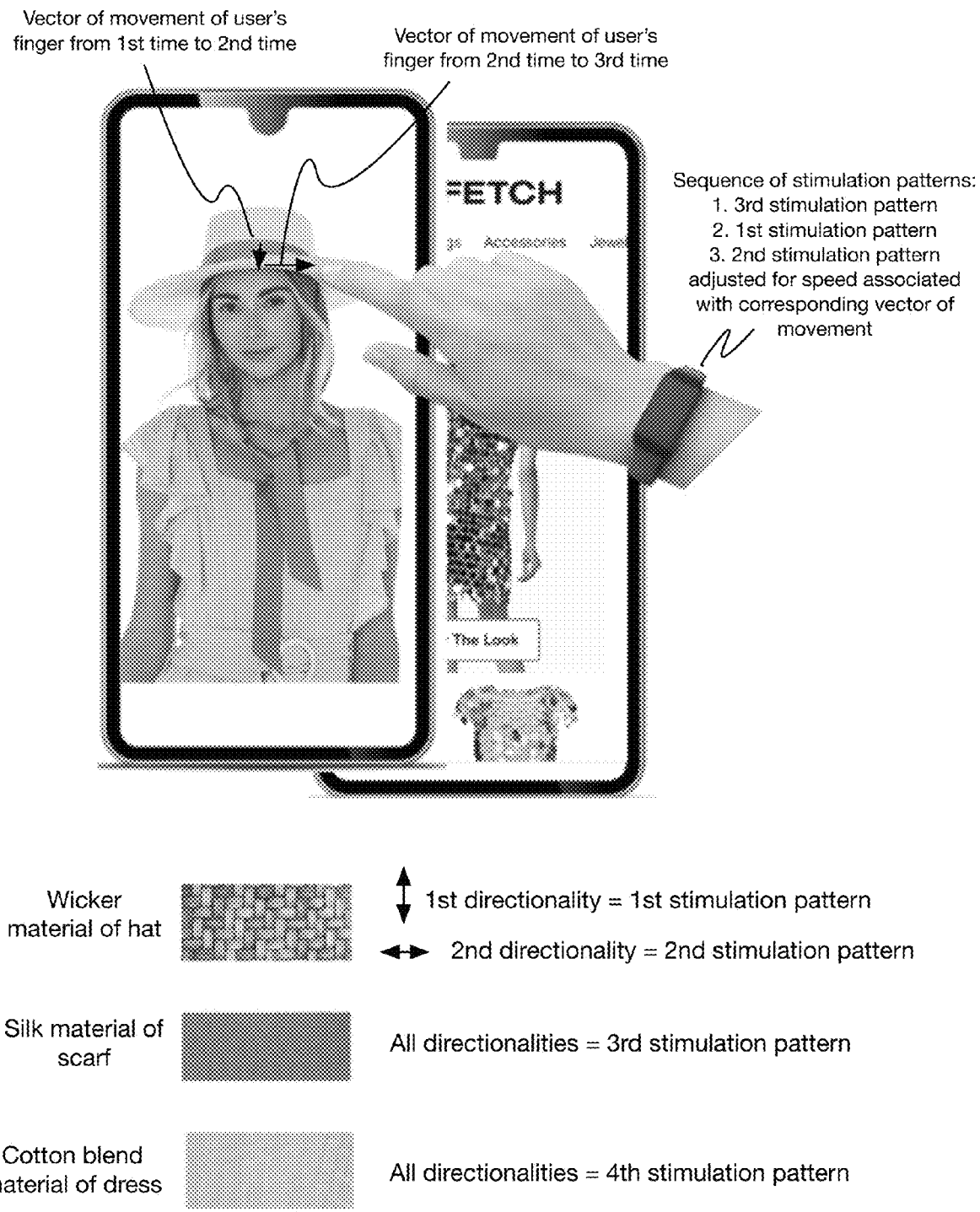
FIG. 3 depicts a variation of a method for conveying digital texture information associated with a consumer website to a user.

In a set of preferred variations, the system is configured to interface with mobile user devices having a touchscreen display (e.g., as shown in FIG. 3), such that the user can virtually interact with and/or scroll through image data displayed at the touchscreen display with his or her fingertips.

The system 100 can additionally or alternatively include and/or interface with any number of $3^{rd}$ party devices, such as, but not limited to, those used in conjunction with an extended reality (e.g., virtual reality [VR], augmented reality [AR], etc.) platform. The extended reality platform preferably functions to provide and control virtual content (e.g., in VR, in AR, in mixed reality, in extended reality, etc.) including a set of virtual objects with which the user interacts during the method 200.

The virtual platform can be configured for any or all of: gaming, task performance (e.g., remote surgery, remote control of robotics, etc.), simulation (e.g., military simulators, flying simulators), training (e.g., surgical training), immersive teleconferencing, and/or any other suitable applications.

In some variations, the virtual platform includes and/or interfaces with a tracking subsystem configured to determine and/or track a user's location (e.g., in a room or other predefined space, relative to a virtual object, etc.), further preferably a location of a particular region of the user's body (e.g., the second body region(s), the user's hands, the user's fingers, the user's torso, the user's head, the user's arm(s), the user's leg(s), the user's feet, etc.).

Additionally or alternatively, the virtual platform can include and/or interface with any other components, and/or the system 100 can include and/or interface with any other suitable $3^{rd}$ party devices.

Digital objects (e.g., produced at a virtual platform), equivalently referred to herein as virtual objects, herein refer to visual content (e.g., visual objects) which the user can perceive (e.g., at a display of a virtual platform such as a display in a VR headset, at a screen of a mobile user device, at any other suitable display, etc.). The digital objects can represent any or all of: inanimate objects (e.g., ball, balloon, weapon, house, building, chair, etc.), animals, people (e.g., virtual representation of user, virtual representation of other users in a multi-user VR game, etc.), and/or any other objects portrayed in virtual applications.

Additionally or alternatively, the system and/or method can be used in conjunction with non-visual (e.g., auditory, olfactory, tactile, etc.) inputs.

The system 100 preferably interfaces with a set of processing and/or computing subsystems (e.g., onboard the haptic device, distributed among multiple components and/or computing systems such as a remote computing system, onboard the user device and/or a $3^{rd}$ party device, remotely located at a cloud-based server and/or computing subsystem, etc.) wherein the processing subsystem and/or computing subsystems can function to: identify a set of digital and/or virtual objects, identify and/or characterize textural features or other features (e.g., object orientations, object edges, object boundaries, object transitions, etc.) of objects, receive and/or retrieve information (e.g., metadata) associated with objects, determine one or more stimulation patterns, store one or more stimulation patterns, monitor system performance, implement a fail-safe (e.g., power shut-off in the event of overheating or stimulation pattern parameter above a predetermined threshold, alarm, etc.), and/or perform any other suitable function(s). Determining a stimulation pattern can include any or all of: determining a new stimulation pattern (e.g., based on an algorithm, based on a machine learning model, etc.), selecting a stimulation pattern (e.g., from a lookup table, from a library, from a record of previously applied stimulation patterns, etc.), determining a set of parameters associated with a stimulation pattern (e.g., a set of weights for a stimulation pattern algorithm, an amplitude a stimulation, a frequency of stimulation, based on a movement vector, based on a change in textures, etc.), and/or any other suitable stimulation pattern and/or parameter(s) associated with a stimulation pattern.

In some variations, the system includes and/or interfaces with a set of models and/or algorithms, which can be implemented by any or all processing and/or computing subsystems of the system.

In preferred examples, the set of models and/or algorithms include trained models and/or algorithms (e.g., machine learning models, deep learning models, computer vision algorithms, etc.) configured for any or all of: the identification and/or distinguishing of objects in image data (e.g., identification of distinct objects, identification of object boundaries to determine when and/or what stimulation patterns are applied at any given time, identification of boundaries between different textures in one or more objects, etc.), the identification and/or characterization of textural information and/or textural features (e.g., surface properties, surface textures, relative smoothness, fiber directionality, etc.) associated with objects, the selection and/or determination of stimulation patterns and/or stimulation parameter values, and/or any other information.

The trained models and/or algorithms are preferably configured to make detections and/or determinations based at least on analysis of image data, and further preferably the image data that the user is viewing (e.g., substantially in real time with the user viewing the image data, prior to the user viewing the image data, etc.). Additionally or alternatively, the trained models and/or algorithms can receive any other information as input, such as, but not limited to: other image data (e.g., for training, for analysis, etc.), supplementary information (e.g., metadata) associated with the image data (e.g., as received directly by the processing subsystem from a consumer website or other platform displaying the image data), user inputs, and/or any other information.

Additionally or alternatively, textural information, object information, and/or any other information can be received (e.g., directly) as supplementary information from a website (e.g., consumer website) or other platform displaying the image data. In some variations, for instance, textural information associated with clothing displayed at a consumer website is received as metadata directly from and/or deduced based on metadata received directly from the consumer website. In the particular example shown in FIG. 3, for instance, metadata received from the consumer website displaying an outfit for sale can indicate that a hat in the image data is made from a wicker material, a scarf in the image data is made from a silk material, and a dress in the image data is made from a cotton blend. Additionally or alternatively, any or all textural features (e.g., directionality of the wicker material, orientation of the hat, etc.) can be received and/or deduced from metadata, determined rom processing of the image data with a set of trained models and/or algorithms, and/or otherwise suitably determined.

The system can optionally include and/or interface with a set of databases (e.g., stored in memory accessible by the processing subsystem), wherein the set of databases can contain information associated with any or all of: a set of stimulation patterns (e.g., baseline stimulation parameters for each texture type and/or texture features), a set of textural features (e.g., directionality, surface properties, etc.) associated with each texture/material type, and/or any other information.

In a set of variations, for instance, a set of databases includes baseline stimulation parameters (e.g., amplitude values, actuator assignment values, temporal actuation durations, sequence of actuator actuations, etc.) for each texture and/or set of textural features.

The system 100 can additionally or alternatively include any other suitable components.

In a first set of variations, the system includes and/or interfaces with: a wristband tactile stimulation device including a set of actuators configured to provide vibratory stimulation to the user according to a set of stimulation patterns, and a processing subsystem which is configured to processing image data displayed to a user at a mobile user device. Additionally, the system can optionally interface with a set of trained models and/or algorithms (e.g., stored at the processing subsystem, evaluated at the processing subsystem, etc.) which can function to process data in accordance with any or all of the processes of the method 200.

In a first set of examples, the processing subsystem is at least partially arranged onboard the wristband tactile stimulation device.

In a second set of examples, the processing subsystem is at least partially arranged onboard the mobile user device.

In a third set of examples, the processing subsystem is at least partially arranged at and/or defined as a remote computing subsystem.

In a fourth set of examples, the processing subsystem is arranged at a combination of locations.

In a second set of variations, the system includes and/or interfaces with: a vest tactile stimulation device including a set of actuators configured to provide vibratory stimulation to the user according to a set of stimulation patterns, and a processing subsystem which is configured to processing image data displayed to a user at a mobile user device. Additionally, the system can optionally interface with a set of trained models and/or algorithms (e.g., stored at the processing subsystem, evaluated at the processing subsystem, etc.) which can function to process data in accordance with any or all of the processes of the method 200.

Additionally or alternatively, any other form factors can be utilized as a tactile stimulation devices.

In a third set of variations, additional or alternative to those described above, the system is configured to interface with an extended reality subsystem and any associated components (e.g., headset display) (e.g., instead of a mobile user device, with a mobile user device, etc.), where the system enables virtual objects displayed to the user (e.g., through a headset display) to convey textural information through tactile stimulation. In a set of examples, for instance, the system is configured to interface with an extended reality subsystem as described in U.S. application Ser. No. 17/076,631, filed 21 Oct. 2020, which is incorporated herein in its entirety by this reference.

Additionally or alternatively, the system can be include any other components and/or be implemented in any other suitable manners.

4. Method 200

As shown in FIG. 2, a method 200 for conveying digital texture information to a user includes any or all of: receiving a set of inputs S100; characterizing a virtual object and/or a user based on the set of inputs S200; determining a stimulation pattern based on the characterization(s) S300; providing stimulation to the user according to the stimulation pattern S400; and repeating any or all of the above processes S500. Additionally or alternatively, the method 200 can include and/or interface with any or all of the processes described in: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, U.S. application Ser. No. 17/033,433, filed 25 Sep. 2020, U.S. application Ser. No. 17/076,631, filed 21 Oct. 2020, U.S. application Ser. No. 17/508,670, filed 22 Oct. 2021, and U.S. application Ser. No. 17/886,785, filed 12 Aug. 2022, each of which is incorporated herein in its entirety by this reference, or any other suitable processes performed in any suitable order.

The method 200 preferably functions to provide information associated with the textures or other surface properties of digital and/or virtual objects to a user through selective (e.g., texture-specific) haptic stimulation. Additionally or alternatively, the method can function to provide other information to users, provide information through other and/or multiple types of stimulation (e.g., bimodal stimulation including haptic stimulation and audio stimulation, bimodal stimulation including haptic stimulation and visual stimulation, multimodal stimulation, etc.), and/or perform any other suitable functions.

In preferred variations, for instance, the method enables the provision of sensory augmentation via vibrations to the skin or other body region of the user, or to a $3^{rd}$ party hardware intermediary, which causes the user to perceive the touch and feel of texture (e.g., as learned through a training process, as detectable without a training process, etc.) of a corresponding digital object (e.g., image data on a mobile user device, virtual object representations as displayed at a headset or other display in an extended reality subsystem, etc.).

Additionally or alternatively, the method can perform any other functions.

4.1 Method—Receiving a Set of Inputs S100

The method 200 preferably includes receiving a set of inputs S100, which functions to receive information with which to perform any or all of the remaining processes of the method.

S100 is preferably performed at least initially in the method 200, but can additionally or alternatively be performed in response to another process of the method 200, multiple times, and/or at any other times.

The set of inputs preferably includes a $1^{st}$ subset of inputs, wherein the $1^{st}$ subset of inputs includes information associated with one or more digital objects (equivalently referred to herein as virtual objects). A digital object can include and/or refer to any or all of: a virtual object in an extended reality (e.g., augmented reality [AR], virtual reality [VR], etc.) platform; a digital object at a user interface (e.g., object depicted in an image on a screen, merchandise on a consumer website, object in a photo and/or video, as shown in FIG. 3, etc.); and/or any other objects or combination of objects.

The information is preferably in the form of image data, wherein the image data can include images (e.g., from a consumer website, from a gaming platform, from an image and/or video viewer, etc.), supplementary data associated with the images (e.g., metadata from a website that characterizes textural information and/or other object information associated with the image data, data used to construct the images (e.g., code and/or programming information), and/or any other information.

The $1^{st}$ subset of inputs can be received from any or all of: a website (e.g., metadata from a consumer website, image and/or video from a website to be analyzed with computer vision process, etc.); an image and/or video viewing platform or program; an extended reality platform (e.g., coordinates describing the location of a virtual object, metadata associated with a virtual texture of the virtual object, etc.); an optical sensor (e.g., camera, video camera, etc.); a database; and/or any other sources.

In a first set of variations, for instance, the $1^{st}$ subset of inputs includes an image of an object and/or descriptive information (e.g., object type, features, fabrics, textures, etc.) associated with the object (e.g., an item) on a website such as a consumer website. In a set of specific examples, for instance, the $1^{st}$ subset of inputs includes metadata associated with a clothing item on a consumer website, such as the item type and the material(s) that the item is made of (e.g., wherein a texture type can be mapped directly from the material type, wherein a texture type can further be determined with a set of models and/or algorithms, etc.).

Figure 4A:
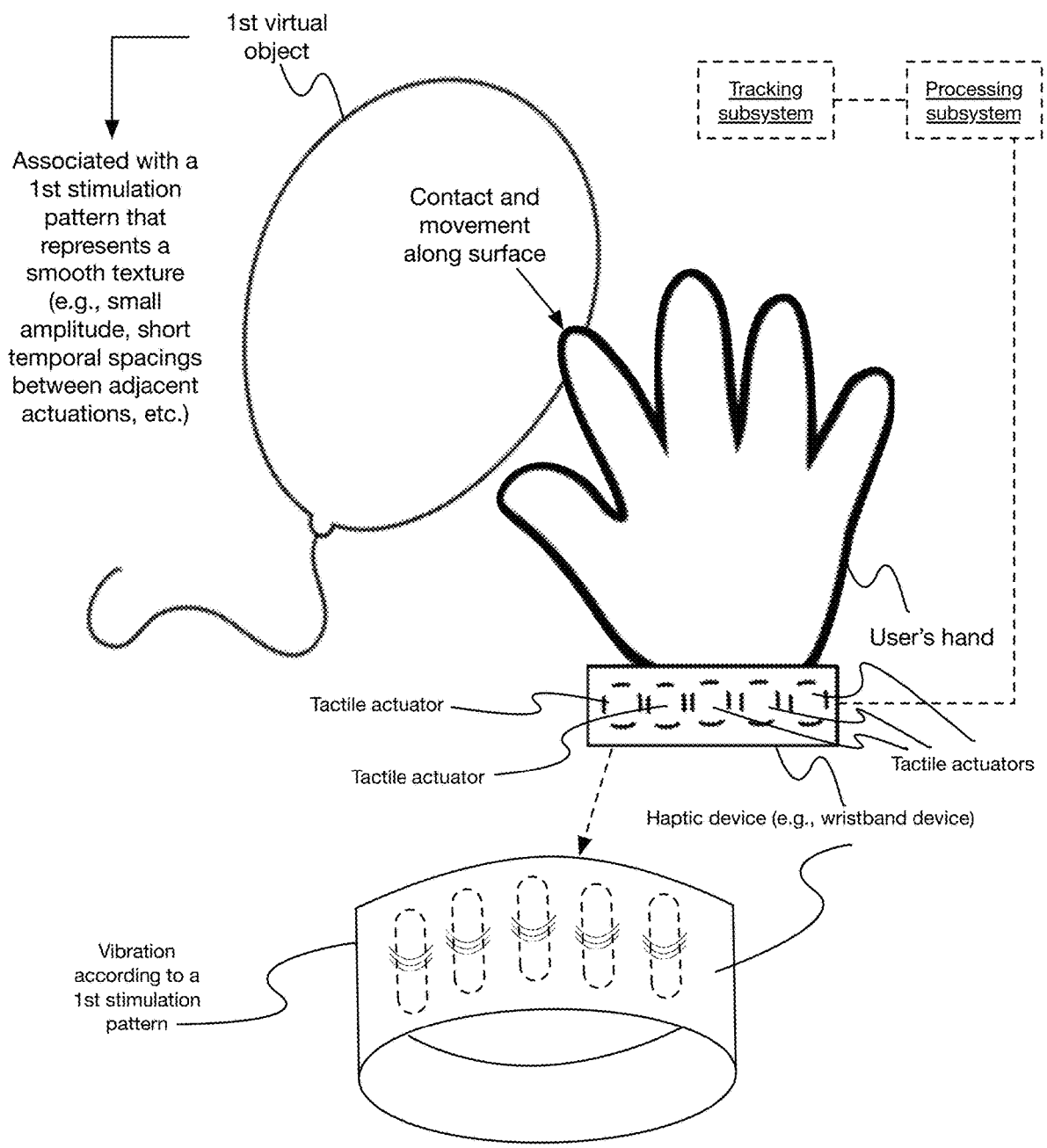
FIGS. 4A-4B depict a variation of a method for conveying digital texture information associated with a virtual reality platform to a user.
Figure 4B:
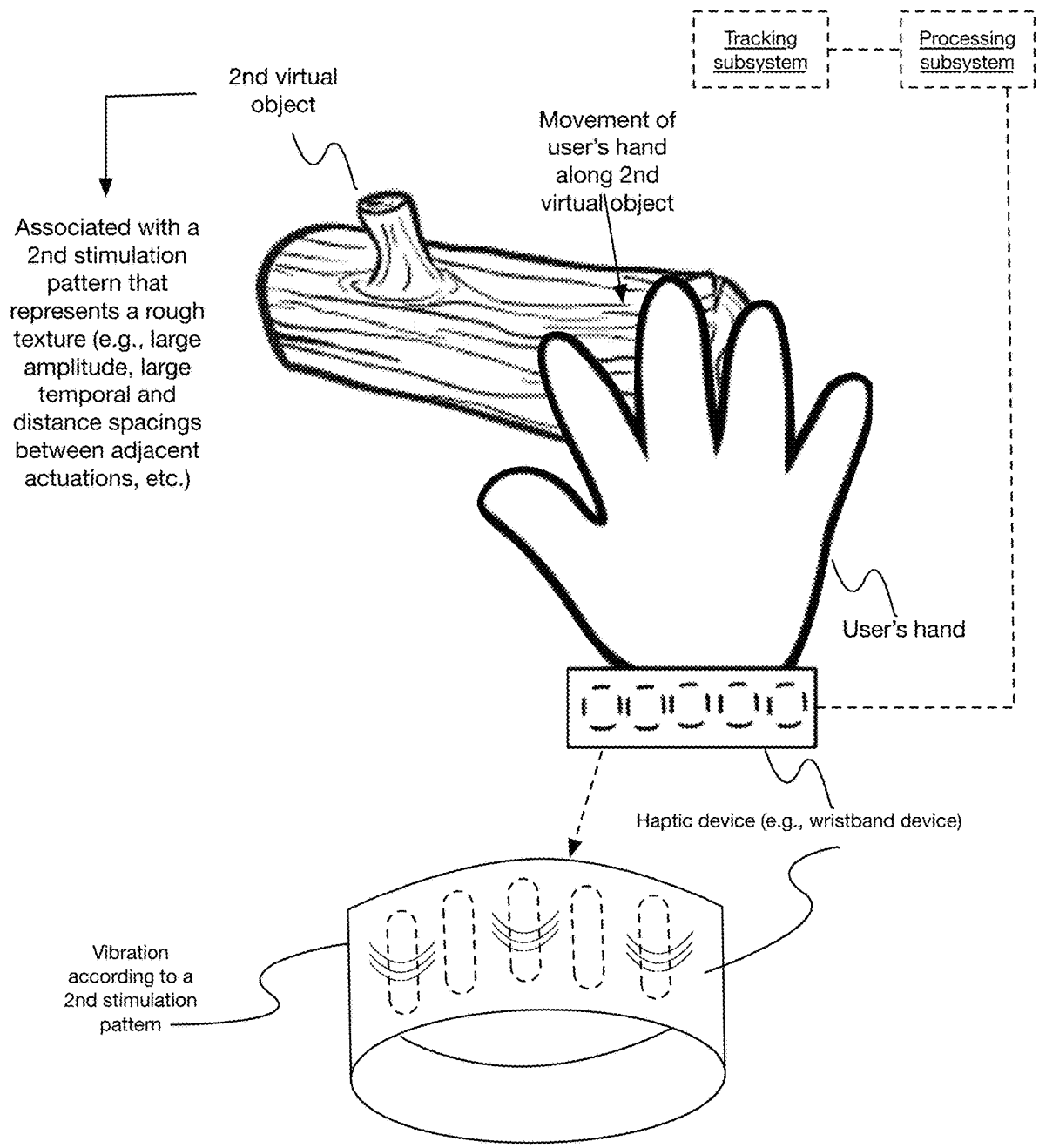

In a second set of variations, for instance, the $1^{st}$ subset of inputs includes location information and descriptive information (e.g., object type, size, textural type, etc.) associated with a set of virtual objects that a user may interact with in an extended reality platform (e.g., as shown in FIGS. 4A-4B).

In a third set of variations, for instance, the $1^{st}$ subset of inputs includes image data (e.g., photo, video feed, etc.) which is processed (e.g., in later processes of the method 200, with a computer vision process, etc.) to detect and/or classify the objects present in the image data and/or any properties associated with the objects.

The set of inputs further preferably includes a $2^{nd}$ subset of inputs, wherein the $2^{nd}$ subset of inputs includes information associated with a user, wherein the user is provided stimulation in accordance with subsequent processes of the method 200. The $2^{nd}$ subset of inputs preferably includes location data associated with the user, such that user's interaction (e.g., virtual interaction) with one or more virtual objects can be determined and/or characterized. Additionally or alternatively, the $2^{nd}$ subset of inputs can include any other information associated with the user, such as any or all of: an identification of the user; features of the user (e.g., which body region is making contact with the virtual object, etc.); and/or any other information.

The $2^{nd}$ subset of inputs can be received from any or all of: one or more sources of the $1^{st}$ subset of inputs (e.g., an extended reality platform such as a hand tracking subsystem which monitors a location of the user's hand); a device providing a user interface (e.g., user device which provides a touch screen for the user to interact with a digital object where the $2^{nd}$ subset of inputs includes location information of the user's finger interacting with the touch screen, user device which provides location information of a user's cursor relative to a virtual object on a website, etc.); and/or any other information sources.

In a first set of variations, the $2^{nd}$ subset of inputs includes touchscreen data (e.g., coordinates of user skin contact with a touchscreen) received directly from a mobile user device which characterizes the locations (e.g., coordinates, x-y coordinates, etc.) and associated times at which the user makes contact (e.g., with his or her fingertip) with a touchscreen.

Figure 5C:
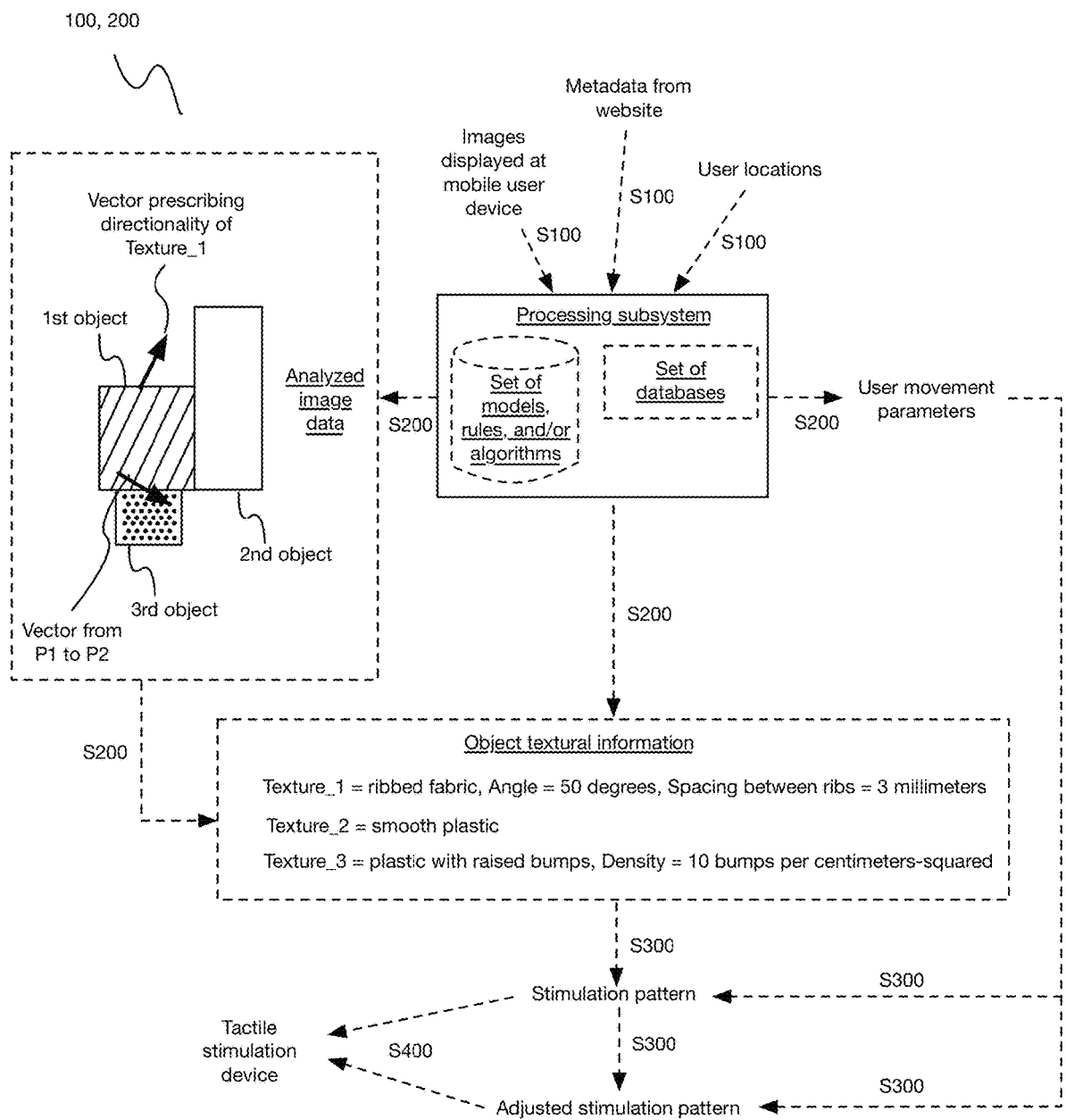

In a set of examples (e.g., as shown in FIG. 3, as shown in FIGS. 5A-5C, etc.), the touchscreen data includes coordinates of the user's contact with a touchscreen surface, which can be used (e.g., in subsequent processes of the method 200) to detect movement and/or determine vectors of movement of the user relative to the touchscreen surface.

In a second set of variations, the $2^{nd}$ subset of inputs includes location information (e.g., 3D coordinates) associated with a user's location in space as received at a tracking subsystem associated with an immersive environment.

In a set of examples (e.g., as shown in FIGS. 4A-4B), the $2^{nd}$ subset of inputs includes locations of the user's hands (e.g., fingertips) and/or other body regions in space, which can be used to determine if and/or how the user makes virtual contact with a set of virtual objects produced at a display of an extended reality (e.g., augmented reality, virtual reality, etc.) subsystem.

Additionally or alternatively, the set of inputs can include any other information from any suitable sources.

4.2 Method—Characterizing a Digital Object and/or a User Based on the Set of Inputs S200

The method 200 can optionally include characterizing a digital object and/or a user based on the set of inputs S200, which functions to inform the parameters and timing associated with stimulation provided to the user in subsequent processes of the method 200. Additionally or alternatively, S200 can function to determine if tactile stimulation should be applied to the user (e.g., upon detecting that movement has occurred), inform the performance or lack thereof (e.g., in an event that no movement of the user relative to the digital object is detected) of other processes of the method 200, and/or can perform any other functions.

S200 is preferably performed in response to and based on any or all of the set of inputs received in S100. Additionally or alternatively, S200 can be performed during (e.g., as part of) S100 (e.g., wherein characteristics of the virtual object are received directly in S100), in response to another process of the method 200, multiple times, and/or at any other times. Alternatively, the method 200 can be performed in absence of S200.

S200 is preferably performed with the processing subsystem, and optionally with any number of trained models and/or algorithms (e.g., as described above). Additionally or alternatively, S200 can be performed with any combination of processing and/or computing subsystems, without trained models and/or algorithms (e.g., with rule-based logic, with predetermined equations such as dynamics equations, etc.), with a set of databases, and/or with any other tools and/or combination of tools.

S200 can optionally include characterizing the digital object S210, which functions to determine one or more features and/or parameters associated with the digital object, which can function to inform any or all parameters (e.g., amplitude, frequency, temporal delays, etc.) associated with the stimulation pattern to be provided to the user in subsequent processes of the method 200.

The set of features and/or parameters preferably individually and/or collectively define the texture(s) of the virtual object and/or textural features, such as, but not limited to, any or all of: a type of material (e.g., fabric, fur, skin, metallic material, wood, plastic, etc.), a feature of the material (e.g., smooth, rough, wet, dry, densely packed, finely packed, ribbed, regular, irregular, long fibered, short fibered, etc.), surface properties of the texture, whether or not the material has a directionality (e.g., first texture in a first direction and second texture in an opposing direction)—such as textural properties which differ depending on which direction movement relative to the texture is occurring, what orientation the object has (e.g., relative to a vector of movement of the user), a stiffness and/or rigidity of the material (e.g., fluid, static, etc.), and/or any other features which affect how the user would perceive the texture of the object.

The set of features and/or parameters for a virtual object can be determined in any or all of the following ways: with a computer vision and/or photogrammetry process; with a set of models (e.g., machine learning model, deep learning model, trained model, rule-based model, etc.) and/or algorithms; with a set of equations; by referencing a database and/or lookup table; with rule-based logic and/or a decision tree; and/or with any other tools.

Additionally or alternatively, any or all of the set of features and/or parameters can be received directly as an input in S100, such as received as metadata (e.g., from a website, extended reality platform, etc.) and/or through product descriptions from a website or other information source.

In some variations, for instance, image data is processed with a computer vision and/or photogrammetry process (e.g., trained machine learning model configured for image analysis) in order to identify the objects in the image data (e.g., classify objects) and thereby enable determination of textural features associated with the object (e.g., by retrieving textural information from a database and/or lookup table). Additionally or alternatively, the textural features can be determined directly with the computer vision and/or photogrammetry process (e.g., by detecting surface variations in the objects, by matching surface features with a library of predetermined textures, etc.).

In other variations, the textural features are received as metadata information, such as from an extended reality platform and/or consumer website.

In yet other variations, the textural features are determined based on processing any or all of the inputs received in S100 with a trained model.

Additionally or alternatively, S210 can include any other suitable processes and/or be used to determine any other information associated with the virtual object(s) (e.g., size, location, speed, direction of movement, etc.).

S200 further preferably includes characterizing the user relative to the virtual object S220, which functions to assess behavior (e.g., location, movement, etc.) associated with the user and use this assessment to determine the timing, type, and/or parameters associated with stimulation applied in subsequent processes of the method 200.

Characterizing the user relative to the virtual object can include any or all of: determining a distance between the user and the virtual object (e.g., based on tracking information from an extended reality platform), detecting contact between the user and the virtual object (e.g., based on the distance, based on tracking information from an extended reality platform, based on touch screen contact information at a user device, etc.), detecting a manipulation of the virtual object by the user (e.g., based on the user making a gesture in an extended reality platform), detecting motion/movement between the user and the virtual object (e.g., how quickly the user is moving his finger over the object at a touch display, detecting that the user is swiping his hand and/or finger over a virtual object in an extended reality platform, in which direction the user is moving relative to the virtual object, etc.), and/or any other characterizations.

In a preferred set of variations, for instance, characterizing the user relative to the virtual object includes checking for contact between the user and a virtual object, determining the location of contact (e.g., which virtual material the user is contacting), and determining any or all of a motion vector characterizing movement of the user relative to the virtual object. The motion vector can include any or all of: a direction of movement (e.g., such that materials with a directionality can be appropriately stimulated), a speed of movement, a pressure associated with the user contacting (e.g., pressing down on) an object, and/or any other parameters.

In some implementations of the method, for instance, movement of the user relative to the digital object (e.g., as displayed at a mobile user device display, as displayed at a headset of a virtual reality subsystem, etc.) is checked for in S200, such that tactile stimulation corresponding to texture is only provided in an event that the user is moving relative to the digital object (e.g., swiping along a digital object using a touchscreen, moving relative to the position of a virtual object in a virtual reality experience, stationary while the digital object is moving, etc.). In examples, for instance, in an event that the user is stationary relative to the digital object, no tactile stimulation is provided for the stationary temporal duration.

Additionally or alternatively, tactile stimulation can be provided at any suitable times.

In a first variation of the preferred set of variations, where the user is interacting with a virtual object in an extended reality (e.g., virtual reality, augmented reality, etc.) platform, S200 includes: determining a virtual location of the virtual object, determining a texture of the virtual object (e.g., based on metadata, based on a predetermined textural assignment, etc.), determining a location of the user (e.g., based on a tracking system data of the extended reality platform), detecting contact (e.g., virtual contact) between the user and the virtual object (e.g., based on an overlap between the locations of the virtual object and the user), and determining a set of motion parameters (e.g., motion vector with a speed and direction) characterizing the user's motion relative to the virtual object based on one or both of the virtual object and the user moving (e.g., based on tracking information of the user and location/motion information prescribed to the virtual object).

In a second variation of the preferred set of variations, where the user is interacting with a digital object on a touch display, S200 includes: determining a virtual location of the digital object (e.g., based on metadata received from a consumer website and/or the user device), determining a texture of the digital object (e.g., based on metadata, based on a predetermined textural assignment, etc.), determining a location of the user (e.g., based on contact sensing information from the touch screen), detecting contact (e.g., virtual contact) between the user and the digital object (e.g., based on an overlap between the locations of the digital object and the user), and determining a set of motion parameters (e.g., motion vector with a speed and direction) characterizing the user's motion relative to the digital object based on one or both of the virtual object and the user moving (e.g., based on touch screen information of the user and location/motion information associated with the digital object).

Additionally or alternatively, S200 can include any other suitable processes.

4.3 Method—Determining a Stimulation Pattern Based on the Characterization(s) S300

The method 200 can include determining a stimulation pattern based on the characterization(s) S300, which functions to prescribe the feel of the stimulation to be provided to the user. Additionally or alternatively, S300 can function to mimic a particular textural experience through provision of the particular stimulation pattern and/or perform any other functions.

The stimulation patterns can prescribe any number of stimulation parameters associated with actuators of the tactile stimulation device, such as, but not limited to: an amplitude of stimulation (e.g., higher amplitude for rougher textures, higher amplitude for denser textures, etc.); duration of stimulation; frequency of stimulation (e.g., frequency at which one or more motors vibrates, frequency with which sequential stimuli are provided, etc.); location of stimulation (e.g., which actuators in a set of multiple actuators are actuated, location on user's body region to be stimulated with illusion-based stimulation, how large of a region is stimulated, etc.); temporal parameters of the stimulation (e.g., duration that each actuator is actuated, duration of the total stimulation pattern, duration of time delay between adjacent actuations and/or adjacent stimulation patterns, etc.); sequence of vibration; pulsing of vibration (e.g., timing of pulse, total duration of pulse, temporal spacing between pulse, duration of each pulse, frequency of pulsing, etc.) and/or any other parameter(s) of stimulation. The haptic actuators can be configured to vibrate with any or all of these parameters fixed (e.g., fixed frequency, fixed amplitude, etc.), dynamic (e.g., dynamic frequency, dynamic amplitude, dynamic duration, dynamic pulsing pattern, based on texture, etc.), and/or any combination.

The stimulation patterns can be any or all of: predetermined (e.g., and stored in a database, referenced in a lookup table, etc.), dynamically determined (e.g., through executing a model and/or algorithm, with a trained model, with a machine learning model, with a deep learning model, etc.), a combination of predetermined and dynamically determined, and/or otherwise suitably determined.

At least a portion of the parameters associated with the stimulation pattern are preferably determined based on a texture associated with the virtual/digital object, such that the stimulation pattern enables the user to perceive and/or recognize the particular texture (e.g., based on prior experience with the tactile stimulation device, based on a difference in feel of tactile stimulation patterns for different textures, etc.). In some variations, for instance, an amplitude (e.g., energy) of stimulation (e.g., where rougher textures [e.g., burlap, tweed, stucco, sandpaper, etc.] have a higher amplitude, where smoother textures [e.g., silk, liquids, metal, etc.] have a lower amplitude, etc.); a duration of stimulation and/or a speed in which actuators are turned on and off (e.g., where smoother textures have a slower transition between on/off states, where rougher textures have a faster transition between on/off states, where a spacing associated with a surface roughness is used to determine the transition between on/off states, etc.); and/or any other parameters.

A motion of the user relative to the virtual/digital object can additionally or alternatively be used to determine and/or adjust (e.g., relative to a baseline stimulation pattern associated with the textures) any or all of the stimulation patterns. In some variations, for instance, in an event that the texture is associated with a directionality (e.g., texture has a rough texture in a first direction and a smoother texture in an opposing direction) and/or regional variation, the direction (e.g., from a motion vector) that the user is moving relative to the virtual/digital object (e.g., in the first direction, in an opposing direction, etc.) determines one or parameters associated with the stimulation (e.g., plays a first stimulation pattern in the first direction, plays a second stimulation pattern in the opposing direction, etc.). In additional or alternative variations, any or all of the stimulation parameters are determined and/or adjusted based on a speed of the user's motion relative to the virtual/digital object. In some examples, for instance, the speed at which the user is moving determines how quickly and/or for what duration stimulation is played (e.g., fast speeds and/or speeds above a predetermined threshold value decrease the duration that each actuator is played, fast speeds increase the frequency with which tactile actuators are turned on and off, fast speeds decrease the total duration for which the stimulation pattern is played, etc.). Further additionally or alternatively, a direction of the user's movement relative to the digital object (e.g., relative to a directionality of the texture of an object) can be used to adjust the stimulation parameters, features of the texture (e.g., spacing/density of raised bumps and/or ridges, size of a basket weave, etc.) can be used to adjust the stimulation parameters, and/or any other information can be used to adjust the stimulation parameters.

In some variations, a set of baseline parameter values (e.g., amplitude/intensity/energy of vibration, frequency of vibration, selection and/or sequence of which actuators of a set of actuators to actuate, duration of actuation, timing of actuation, duration of delay between successive actuations, etc.) are associated with (e.g., assigned to, predetermined for, etc.) each texture type, wherein the baseline parameter values can optionally be adjusted based on any or all of: movement features (e.g., speed, direction, etc.), textural features, user information (e.g., user preferences), and/or any other information.

Additionally or alternatively, any or all of the stimulation parameters can be dynamically calculated (e.g., based on inputs from S100, based on input processing in S200, with a set of trained models and/or algorithms, with a set of rule-based logic and/or decision trees, etc.), predetermined (e.g., fixed), and/or otherwise suitably determined.

Additionally or alternatively, stimulation patterns can be otherwise determined.

Additionally or alternatively, S300 can include any other suitable processes.

4.4 Method—Providing Stimulation to the User According to the Stimulation Pattern S400

The method 200 can include providing stimulation to the user according to the stimulation pattern S400, which functions to provide the stimulation to the user.

S400 is preferably performed in response to S300, but can additionally or alternatively be performed at any other suitable time(s).

S400 includes actuating any or all of a set of tactile actuators onboard a tactile stimulation device according to the stimulation pattern(s) (e.g., with a controller and a set of control commands determined based on the stimulation pattern). Additionally or alternatively, S400 can include any other suitable processes.

4.5 Method—Repeating any or all of the Above Processes S500

The method 200 can include repeating any or all of the above processes S500, which functions to continuously provide and/or adjust the provision of stimulation to the user (e.g., during the user's interaction with multiple virtual objects in an extended reality platform, during the user's interaction with multiple digital objects on a consumer website, etc.).

S500 can optionally include, for instance, continuously checking for updates in the characterizations of S200, such that the stimulation patterns are determined, stopped, adjusted, and/or changed based on any or all of: the user interacting with a new object, the user interacting with a new texture in an object, the user changing direction and/or speed of movement, the object changing direction and/or speed of movement, the user and/or object changing location, and/or any other changes.

Additionally or alternatively, the method 200 can include any other processes (e.g., training any or all of the set of models and/or algorithms).

5. Variations

In a preferred set of variations of the method, the method is configured to enable digital image information portrayed to a user at a display to be attributed textural information, which is then conveyed to the user through tactile stimulation at a tactile stimulation device. The method preferably interfaces with a system which includes the tactile stimulation device (e.g., wristband, vest, etc.) and a processing subsystem, but can additionally or alternatively interface with any other suitable components (e.g., as described above).

In a demonstrative set of examples of the method and an associated system as shown in FIGURES 5A-5C, the method includes: collecting input data associated with the user and the digital data, the inputs including user location information (e.g., as represented as point P1 at which the user's fingertip contacts a touchscreen surface at time $t_1$ and point P2 at which the user's fingertip contacts the touchscreen surface at time $t_2$) and information associated with the image data being displayed (e.g., the images themselves, metadata describing objects in the images from the website that is displaying the images) such that the user's location (e.g., location of virtual contact between the user and digital object) relative to the image can be determined; processing the input data (e.g., with a set of models and/or algorithms, with a set of databases and/or lookup tables, etc.) to determine any or all of: if the user is moving relative to the digital object(s) (e.g., based on a dynamic calculation with P1, P2, $t_1$, and $t_2$) and if so, with what associated parameters (e.g., speed, direction, etc.), what objects are present in the image data (e.g., distinguishing between the $1^{st}$, $2^{nd}$ and $3^{rd}$ objects in FIG. 5C), what textural information is associated with each of the identified objects (e.g., based on receiving metadata from the website that specifies what materials the objects are constructed from, based on processing the image data with a set of models and/or algorithms, based on metadata for material identification and processing the image data with a set of trained models and/or algorithms for textural features, etc.), and/or any other outputs; determining a stimulation pattern to be applied at the tactile stimulation device (e.g., based on a predetermined mapping between the textural information and a set of predetermined stimulation patterns, based on a dynamic stimulation pattern generation process, etc.); optionally adjusting parameters of the stimulation pattern (e.g., based on user movement parameters such as speed, based on an orientation of the user's movement relative to a textural directionality of the object such as based on an angle between the vector from P1 to P2 and a vector prescribing the directionality of Texture_1 in FIG. 5C, etc.); and providing the stimulation pattern (e.g., adjusted stimulation pattern) to the user at the tactile stimulation device.

In a particular implementation of the set of examples, a baseline stimulation pattern which is determined based on a material associated with the digital objects (e.g., fabric of Texture_1, plastic of Texture_2, plastic of Texture_3) can be adjusted based on supplementary textural features of these materials and/or movement characteristics of the user (e.g., speed of movement, direction of movement, etc.). For instance, stimulation parameters associated with Texture_1 can be adjusted based on the ribbing of the fabric and how the user moves relative to the ribbing (e.g., if speed of movement increases while moving perpendicular to the ribs, a temporal gap between successive stimuli at actuators of the tactile stimulation device can be decreased). Additionally or alternatively, stimulation parameters associated with the plastic of Texture_3 can be adjusted based on the detection of the raised bumps and/or their density, such that the temporal gap between successive stimuli is decreased as the density increases and/or the amplitude of the stimulation is increased as bump height increases, etc. These features can be determined with trained models and/or algorithms (e.g., computer vision machine learning algorithm), received and/or deduced metadata, and/or any other information or combination of information.

In a second demonstrative set of examples, any or all of the processes in the first demonstrative set of examples described above are implemented and/or modified to be implemented for digital data presented to a user at a display (e.g., headset display) utilized in conjunction with an immersive environment (e.g., virtual reality, augmented reality, etc.).

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for providing digital texture information in a tactile manner to a user, the method comprising:
   with a processing subsystem in communication with a tactile stimulation device and a mobile user device comprising a touchscreen surface:
      receiving a set of position coordinates corresponding to a first set of user locations relative to the touchscreen surface at a set of times;
      receiving image data associated with a set of images displayed to the user at the mobile user device;
      processing the set of position coordinates to check for a movement of the user along the touchscreen surface;
      in response to detecting a relative movement between the user and a virtual object displayed on the touchscreen surface:
         calculating a speed of the movement;
         processing the image data to determine a set of textural information displayed to the user in the set of images;
         determining a subset of the set of textural information that applies to the set of position coordinates;
         retrieving a baseline set of stimulation patterns corresponding to the subset of the set of textural information, wherein the baseline set of stimulation patterns defines a set of stimulation parameters;
         adjusting the set of stimulation parameters based on the speed of the movement to produce a refined set of stimulation patterns; and
         activating a set of actuators of the tactile stimulation device, the tactile stimulation device remote from the mobile user device, according to the refined set of stimulation patterns;
      in response to detecting that the user is stationary relative to the virtual object displayed on the touchscreen surface, preventing the provision of tactile stimulation at the tactile stimulation device.

2. The method of claim 1, wherein the first set of user locations comprises a set of locations of a fingertip of the user.

3. The method of claim 1, wherein the image data comprises metadata from a consumer website, wherein the metadata comprises a material of the virtual object displayed within the set of images, wherein the set of images is displayed to the user through the consumer website.

4. The method of claim 1, wherein the image data comprises the set of images.

5. The method of claim 4, wherein processing the image data comprises processing the set of images with a trained machine learning model.

6. The method of claim 5, wherein the trained machine learning model is configured to identify materials associated with the image data, the set of textural information comprising the materials.

7. The method of claim 1, wherein adjusting the set of stimulation parameters comprises decreasing a temporal gap between successive activations in response to the speed of the movement having a value above a predetermined threshold.

8. A system for providing digital texture information in a tactile manner to a user, the system comprising:

a tactile stimulation device in communication with a mobile user device, the mobile user device comprising a touchscreen, wherein the mobile user device is configured to:
  receive a set of position coordinates corresponding to a set of user locations relative to a surface of the touchscreen at a set of times;
  display a set of image data to the user;
a processing subsystem in communication with the tactile stimulation device and the mobile user device, wherein the processing subsystem is configured to:
  process the set of image data to determine a set of textural information displayed to the user at the set of times, the set of textural information associated with objects in the set of image data;
  process the set of position coordinates to determine if a movement of the user has occurred relative to an object in the set of image data;
  in response to detecting that a movement has occurred:
    calculating a speed of the movement;
    determining a subset of the set of textural information that applies to the set of position coordinates;
    retrieving a baseline set of stimulation patterns corresponding to the subset of the set of textural information, wherein each of the baseline set of stimulation patterns defines a set of stimulation parameters;
    adjusting the set of stimulation parameters based on the speed of the movement to produce a refined set of stimulation patterns;
    activating a set of actuators of the tactile stimulation device, the tactile stimulation device remote from the mobile user device, according to the refined set of stimulation patterns;
  in response to detecting that no movement has occurred, preventing the provision of tactile stimulation at the tactile stimulation device.

9. The system of claim 8, further comprising a set of trained machine learning models implemented by the processing subsystem.

10. The system of claim 8, wherein processing the set of image data to determine a set of textural information comprises identifying a set of objects present in the image data.

11. The system of claim 10, wherein identifying the set of objects comprises distinguishing between boundaries of the set of objects.

12. The system of claim 10, wherein processing the set of image data to determine a set of textural information further comprises determining directional properties associated with materials of the set of objects.

13. The system of claim 12, wherein the directional properties are determined with a set of trained machine learning models.

14. The system of claim 13, further comprising:
  calculating a direction of the movement of the user; and
  determining an angle between the direction of the movement of the user and a vector prescribing the directional properties.

15. The system of claim 14, further comprising adjusting the set of stimulation parameters based on the angle.

16. The system of claim 10, wherein the processing subsystem further determines that the movement of the user is associated with a location of the user experiencing a transition between objects having different textures.

17. The system of claim 16, wherein detecting the transition between objects having different textures is performed with a trained machine learning model.

18. The system of claim 8, wherein the tactile stimulation device is configured to encircle an arm region of the user.

19. The system of claim 8, wherein the image data comprises metadata from a consumer website, wherein the set of images is displayed to the user through the consumer website.

20. The system of claim 8, wherein the image data comprises a set of images displayed to a user at a consumer website.

* * * * *